United States Patent [19]

Krowl et al.

[11] Patent Number: 5,073,199
[45] Date of Patent: Dec. 17, 1991

[54] INSULATING MATERIAL CONTAINING PITCH BASED GRAPHITE FIBER

[75] Inventors: Thomas R. Krowl, Littleton, Colo.; Norman Scheffer, Chelmsford, Mass.

[73] Assignee: BNZ Materials, Inc., Littleton, Colo.

[21] Appl. No.: 618,496

[22] Filed: Nov. 27, 1990

[51] Int. Cl.⁵ .......................... C04B 2/02; C04B 14/38
[52] U.S. Cl. ..................... 106/797; 106/795; 106/796; 501/123; 501/124; 501/133; 501/153
[58] Field of Search ............... 106/795, 796, 797; 501/123, 124, 133, 153

[56] References Cited

U.S. PATENT DOCUMENTS

| | | | |
|---|---|---|---|
| 4,101,335 | 7/1978 | Barrable | 106/644 |
| 4,111,712 | 9/1978 | Pusch | 106/698 |
| 4,128,434 | 12/1978 | Pusch | 106/698 |
| 4,132,555 | 1/1979 | Barrable | 106/795 |
| 4,144,121 | 3/1979 | Otouma et al. | 106/797 |
| 4,334,931 | 6/1982 | Asaumi et al. | 106/797 |
| 4,690,867 | 9/1987 | Yamamoto et al. | 428/367 |
| 4,773,470 | 9/1988 | Libby et al. | 164/487 |
| 4,897,294 | 1/1990 | Libby et al. | 106/38.2 |

Primary Examiner—Mark L. Bell
Assistant Examiner—Anthony J. Green
Attorney, Agent, or Firm—Brian D. Smith

[57] ABSTRACT

An asbestos-free insulating material suitable for use in molten metal casting is disclosed. The material is made from a mixture comprising lime, siliceous component, wollastonite, inorganic fiber and pitch based graphite fiber. The mixture is mixed with water to form a slurry, shaped, heated in the presence of steam, and dried to remove free water.

15 Claims, No Drawings

INSULATING MATERIAL CONTAINING PITCH BASED GRAPHITE FIBER

TECHNICAL FIELD

The present invention relates to an insulating material that is resistant to attack by molten metal. More particularly, the invention relates to an insulating material containing pitch-based graphite fiber.

BACKGROUND OF THE INVENTION

Insulating materials resistant to attack by molten metals, including aluminum alloys, are known to the prior art. For example, Moritz U.S. Pat. No. 3,212,142 discloses a process and apparatus for continuous aluminum casting. The apparatus includes a mold having an outer metal shell lined with an annular header or liner of insulating material. The insulating header is made from a composition wherein asbestos fibers are distributed in an inorganic binder.

Asbestos-containing insulating materials have performed satisfactorily in the aluminum industry for several years. However, it is now necessary to discontinue usage of asbestos-containing materials because of health concerns. Accordingly, there is presently a need for asbestos-free insulating materials suitable for use as headers in continuous aluminum alloy casting.

U.S. Pat. Nos. 4,773,470 and 4,897,294 to Libby, et al. disclose calcium silicate insulating materials containing delaminated vermiculite which are claimed to be suitable for use as headers in continuous aluminum alloy casting. Other insulating materials which are used for various purposes are as follows.

Barrable U.S. Pat. No. 4,101,335 claims a fire-resistant asbestos-free building board comprising mica or a mixture of mica and standard vermiculite distributed in a calcium silicate binder. Barrable U.S. Pat. No. 4,132,555 claims an asbestos-free building board comprising standard vermiculite distributed in a water-soluble binder containing organic reinforcing fibers.

U.S. Pat. No. 4,690,867 to Yamamoto, et al. discloses a xonotlite-type calcium silicate insulating material containing carbon fiber as a reinforcing fiber. Other asbestos-free calcium silicate insulating materials known to the present inventors are disclosed in U.S. Pat. Nos. 4,111,712 and 4,128,434 to Walter Pusch.

A principal objective of the present invention is to provide an insulating material suitable for use in continuous molten metal casting.

A related objective of the invention is to provide an asbestos-free insulating material.

Another objective of the invention is to provide an insulating material having good toughness and resistance to high temperature cracking.

Additional objectives and advantages of the invention will become readily apparent to persons skilled in the art from the following detailed description of our invention.

DISCLOSURE OF THE INVENTION

In accordance with the present invention, there is provided an insulating material comprising about 15–40 weight percent lime, about 15–40 weight percent siliceous component, about 15–50 weight percent wollastonite, about 0–10 weight percent organic fiber, and about 0.5–15 weight percent organic fiber wherein 0.5 to 5 weight percent of the organic fiber is a pitch base graphitic fiber. The composition preferably comprises about 20 to 35 weight percent lime, about 20 to 35 weight percent siliceous component, about 20 to 45 weight percent wollastonite, about 0 to 8 weight percent organic fiber, about 0 to 12 weight percent inorganic fiber, and about 0.5 to 12 weight percent organic fiber wherein 0.5 to 4 weight percent of the organic fiber is a pitch base graphitic fiber. The material is also preferably substantially asbestos-free.

A more preferred composition comprises 28 to 32 weight percent lime; 23 to 27 weight percent siliceous component; 35 to 40 weight percent wollastonite; and 0.5 to 8 weight percent organic fiber wherein 0.5 to 3 weight percent of the organic fiber is a pitch base graphitic fiber.

The material is made by mixing together a mixture comprising lime, the siliceous component, wollastonite, organic fiber, inorganic fiber and pitch based graphitic fiber with water to form an aqueous slurry; molding the aqueous slurry into a wet shape; expelling water form the wet shape; heating the wet shape in the presence of steam; and drying the wet shape to remove water. The step of heating in the presence of steam is preferably performed above 100° C. at superatmospheric pressure.

Lime comprises about 15–40 weight percent of the mixture, preferably about 20 to 35 weight percent and more preferably about 28 to 32 weight percent. The lime may be any suitable hydrated lime or quicklime.

The siliceous component may be any of several sources of substantially pure oxides of silicon. The sources include silica, diatomacious earth, silica fume, and similar materials. The siliceous component comprises about 15–40 weight percent of the mixture, preferably about 20–35 weight percent and more preferably about 23–27 weight percent.

A particularly preferred embodiment comprises about 15–40 weight percent siliceous component of which 2–20 weight percent is colloidal silica. Colloidal silica's singular particle orientation and extremely small size (diameter 5 to 150 nanometers, $5-150 \times 10^{-9}$ meters) have been found to provide good results. Unlike other siliceous materials having a smaller diameter and larger surface area, colloidal silica does not form aggregates. As such, colloidal silica provides uniform dispersion, reactivity, and viscosity stability during forming. The finished product has lower porosity, improved shrinkage, higher strength, better heat resistance (more refractory) and a more homogenous, monolithic calcium silicate matrix. Colloidal silica preferably comprises about 5 to 17 weight percent of the mixture and more preferably about 8 to 15 weight percent.

As used herein the term "pitch based graphitic or graphite fiber" refers to graphite fiber formed specifically from pitch not PAN (Polyacrylnitrile) fibers. The fiber is preferably carbonized at 1000° C. and additionally heat treated at 2000° C. This manufacturing process is believed to provide the following benefits:

More stable graphitic structure (99% carbon);
Lower oxidation at higher temperatures;
Virtually no moisture pickup with increased humidity; and
Improved performance when in contact with aluminum.

When pitch based graphite fiber is dispersed in a tobormorite calcium silicate matrix it improves mechanical toughness, machinability, and high temperature strength. Cracking at high temperatures is also reduced.

The preferred parameters of the pitch based graphite fiber of the present invention are as follows:
Diameter—14.5 microns
Length—3.0 mm
Tensile strength—590 MPa
Specific gravity—1.63.

Pitch based graphite fiber having these characteristics is available from the Kreha Corporation of America, New York, N.Y. and sold under the tradename Kreca and designated as KGF-200 graphite tow.

Wollastonite is a crystalline form of anhydrous calcium silicate. It is preferable to use wollastonite having a particle size whereby approximately 60 weight percent of its particles pass through a sieve no. 50 mesh screen. The mixture comprises about 15–50 weight percent wollastonite, preferably about 20 to 45 weight percent and more preferably about 35 to 40 weight percent.

The mixture may also contain 5 to 25 weight percent of a member selected from the group consisting of vermiculite, mica, spodumene and lithium aluminate. Mixtures containing 5 to 15 weight percent exfoliated vermiculite and more preferably 8 to 13 weight percent vermiculite have been found to provide good resistance to high temperature cracking and shrinkage. The exfoliated vermiculite preferably has a particle size whereby approximately 60 weight percent pass through a sieve no. 140 mesh screen.

The mixture of ingredients also preferably contains up to about 10 weight percent additional organic fiber i.e. in addition to the graphite fiber to provide green strength. More preferred ranges contain, about 0–8 weight percent organic fiber and more preferably about 1–7 weight percent. The organic fiber may be wood fiber, polyester or other synthetic fiber, cotton or other natural fibers. Kraft which is a wood pulp is particularly preferred.

In addition, the mixture preferably contains up to 15 weight percent of an inorganic fiber preferably up to 12 weight percent and more preferably up to about 5 weight percent. A preferred inorganic fiber is alkaline resistant glass. The purpose of the non-graphite organic fiber and inorganic fiber is to provide "green strength" to the insulating material prior to being cured by steam and also to provide stress distribution during drying and curing.

The insulating material of the invention is particularly suitable for use in the continuous casting of light metals, especially aluminum and magnesium alloys.

DETAILED DESCRIPTION OF A PREFERRED EMBODIMENT

The following table sets forth the test results of six examples which were prepared and tested to evaluate their suitability for use as insulating materials, such as a header, in the continuous direct chill casting of aluminum. U.S. Pat. No. 4,897,294 to Libby, et al. which is hereby incorporated by reference provides a good discussion of the use of a header in the continuous direct chill casting of aluminum.

Example 3 of the table was made by preparing a mixture comprising approximately 2.1% Kraft, 29.5% Lime, 37.1% Wollastonite, 12.5% Micro Silica, 13.2% Colloidal Silica, 4.6% glass, and 1.0% pitch based graphitic fiber. The mixture was slurried in about 4–5 parts water per part of the mixture. This slurry was then molded in a pressure mold to form a wet shape. The wet shape was then cured by autoclaving in saturated steam for several hours at approximately 170° C. The cured material was dried at approximately 110° C. to reduce moisture content. The material was then subjected to a heat treating cycle wherein the temperature was raised over a twenty-four hour period from about 200° C. to about 500° C. An eighteen hour treat treating period may be employed; a twenty-four hour period, however, is preferred. The cured and dried material had a calcium silicate crystalline matrix that was predominately tobormorite. The other examples set forth in the table were prepared in the same manner except, of course, for the composition of the mixtures.

|  | Example 1 | Example 2 | Example 3 | Example 4 | Example 5 | Example 6 |
|---|---|---|---|---|---|---|
| KRAFT | 2.1 | 5.4 | 2.1 | 4.0 | 2.1 | 2.1 |
| LIME | 29.8 | 22.3 | 29.5 | 37.7 | 24.5 | 25.0 |
| WOLLASTONITE | 37.3 | 40.0 | 37.1 |  | 34.9 | 35.4 |
| MICRO SILICA | 12.9 |  | 12.5 |  | 12.2 | 12.2 |
| DIATOMACEOUS EARTH |  | 22.3 |  | 37.7 |  |  |
| A/R GLASS | 4.6 |  | 4.6 |  | 4.8 | 4.8 |
| AMORPHOUS SILICA (COLLOIDAL) | 13.2 |  | 13.2 |  | 8.6 | 8.6 |
| GRAPHITE FIBER |  |  | 1.0 |  | 1.0 |  |
| MARINITE FINES |  | 10.0 |  | 17.5 |  |  |
| VERMICULITE |  |  |  |  | 11.5 | 11.5 |
| CLAY |  |  |  | 3.1 |  |  |
| SUGAR | .1 |  |  |  | .4 | .4 |
| AUTOCLAVING CONDITIONS | 32 hrs/ 100 psi | 20 hrs/ 100 psi | 32 hrs/ 100 psi | 20 hrs/ 100 psi | 32 hrs/ 100 psi | 32 hrs/ 100 psi |
| DENSITY lbs/ft$^3$ | 46.0 | 46.0 | 46.0 | 28.3 | 46.0 | 46.0 |
| MODULUS OF RUPTURE (psi) | 700 | 800 | 641 | 379 | 800 | 800 |
| TOUGHNESS (+, −) | − | − | + | − | + | − |
| HIGH TEMPERATURE CRACKING (cycle) | 1 | 1 | 5 | 1 | 3 | 2 |
| HIGH TEMPERATURE SHRINKAGE (1350° F.) % | .4 | .4 | .4 | 1.5 | .2 | .2 |

As set forth in the table, of the six examples tested, only those containing pitch based graphitic fiber (i.e. Examples 3 and 5) were found to have good toughness and resistance to high temperature cracking. These are properties which a good molten metal insulating material should possess.

Toughness as used herein is defined as the measure of a bending sample to sustain a load after ultimate load fracture has occurred. This is graphically demonstrated by plotting load in pounds on the y axis and deflection in inches on the x axis. i.e., +, denotes a sustained load carrying capacity (80%–60% of ultimate load) after sample failure; −, denotes a brash failure, total loss of load carrying capacity at bending failure.

High temperature cracking as used herein is defined as the ability of a sample to withstand cracking when subjected to the heat and erosion of a 1624° F. natural gas flame. Each sample is exposed five times to flame and allowed to cool between heat cycles. i.e. numerical rating 1 to 5; 1 being poorest and 5 being the best.

While both examples 3 and 5 contained pitch based graphite fiber, example 5 also contained 11.5 weight percent vermiculite. Vermiculite appears to be responsible for reducing the material's high temperature shrinkage without significantly affecting any of the material's other important properties. Since molten metal insulating materials are preferably resistant to high temperature shrinkage, materials containing both pitch base graphite fiber and vermiculite (or vermiculite substitute such as mica, spodumene and lithium aluminate) represent another preferred embodiment of the present invention.

The foregoing detailed description of our invention has been made with reference to a preferred embodiment thereof. From such description, one skilled in the art can easily ascertain the essential characteristics of this invention, and without departing from the spirit or scope thereof make various changes and modifications to adapt it for various usages and conditions.

What is claimed:

1. An insulating material comprising about:
   a. 15 to 40 weight percent lime;
   b. 15 to 40 weight percent siliceous component;
   c. 15 to 50 weight percent wollastonite;
   d. 0 to 15 weight percent inorganic fiber to provide green strength; and
   e. 0.5 to 15 weight percent organic fiber wherein 1.5 to 5 weight percent is pitch base graphitic fiber.

2. An insulating material comprising about:
   a. 20 to 35 weight percent lime;
   b. 20 to 35 weight percent siliceous component;
   c. 20 to 45 weight percent wollastonite;
   d. 0 to 12 weight percent inorganic fiber to provide green strength; and
   e. 0.5 to 12 weight percent organic fiber wherein 0.5 to 4 weight percent is pitch base graphitic fiber.

3. An insulating material suitable for use in continuous molten metal casting comprising about:
   a. 28 to 32 weight percent lime;
   b. 23 to 32 weight percent siliceous component;
   c. 35 to 40 weight percent wollastonite;
   d. 1 to 7 weight percent inorganic fiber to provide green strength; and
   e. 0.5 to 8 weight percent organic fiber wherein 0.5 to 3 weight percent is pitch base graphitic fiber.

4. An insulating material as claimed in claim 1 wherein said material is substantially asbestos-free.

5. An insulating material as claimed in claim 1 wherein the siliceous component includes 2–20 weight percent colloidal silica.

6. An insulating material as claimed in claim 1 wherein the siliceous component includes 5 to 17 weight percent colloidal silica.

7. An insulating material as claimed in claim 1 wherein the siliceous component includes 8 to 15 weight percent colloidal silica.

8. An insulating material as claimed in claim 1 further comprising 5 to 25 weight percent of a member selected from the group consisting of vermiculite, mica, spodumene and lithium aluminate.

9. An insulating material as claimed in claim 1 further comprising 5 to 15 weight percent vermiculite.

10. An insulating material as claimed in claim 1 further comprising 8 to 13 weight percent vermiculite.

11. An insulating material as claimed in claim 1 wherein said material is made by mixing a mixture comprising 15–40 weight percent lime, 15–40 weight percent siliceous component, 15–50 weight percent wollastonite, 0 to 15 weight percent inorganic fiber and 0.5 to 15 weight percent organic fiber wherein 0.5 to 5 weight percent is pitch based graphitic fiber with water to form an aqueous slurry; molding the aqueous slurry into a wet shape; expelling water from the wet shape; heating the wet shape in the presence of steam; and drying the wet shape to remove free water.

12. An insulating material as claimed in claim 11 wherein said material has a matrix comprising calcium silicate hydrate.

13. An insulating material as claimed in claim 11 wherein said material has a matrix comprising predominately tobormorite.

14. An asbestos-free insulating material consisting essentially of about:
   a. 15 to 40 weight percent lime;
   b. 15 to 40 weight percent siliceous component of which 2–20 weight percent is colloidal silica;
   c. 15 to 50 weight percent wollastonite;
   d. 0 to 15 weight percent inorganic fiber to provide green strength; and
   e. 0.5 to 15 weight percent organic fiber wherein 0.5 to 5 weight percent is pitch based graphite fiber.

15. An asbestos-free insulating material made by the steps of:
   a. Mixing a mixture comprising about 15 to 40 weight percent lime, about 15 to 40 weight percent silica, about 15 to 50 weight percent wollastonite, 0 to 15 weight percent inorganic fiber, and 0.5 to 15 weight percent organic fiber wherein 0.5 to 5 weight percent is pitch based graphitic fiber with water to form an aqueous slurry;
   b. Molding the aqueous slurry into a wet shape;
   c. Expelling water from the wet shape;
   d. Heating the wet shape above 170° C. in the presence of steam;
   e. Drying the wet shape to remove free water; and
   f. Subjecting the dried wet shape to a heat treating cycle wherein the temperature is raised over at least an 18 hour period from about 200° C. to about 500° C.

* * * * *